US010678927B2

(12) United States Patent
Srinivas et al.

(10) Patent No.: US 10,678,927 B2
(45) Date of Patent: Jun. 9, 2020

(54) RANDOMIZED EXECUTION COUNTERMEASURES AGAINST FAULT INJECTION ATTACKS DURING BOOT OF AN EMBEDDED DEVICE

(71) Applicant: Texas Instruments Incorporated, Dallas, TX (US)

(72) Inventors: Madan Srinivas, Gaithersburg, MD (US); Sachin Billore, Bangalore (IN); Kavitha Malarvizhi, Bangalore (IN); Amritpal Mundra, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 107 days.

(21) Appl. No.: 15/692,171

(22) Filed: Aug. 31, 2017

(65) Prior Publication Data

US 2019/0065751 A1     Feb. 28, 2019

(51) Int. Cl.
| G06F 21/00 | (2013.01) |
| G06F 21/57 | (2013.01) |
| G06F 9/4401 | (2018.01) |
| G06F 21/56 | (2013.01) |
| G06F 1/24 | (2006.01) |

(52) U.S. Cl.
CPC .............. *G06F 21/575* (2013.01); *G06F 1/24* (2013.01); *G06F 9/4401* (2013.01); *G06F 21/566* (2013.01); *G06F 2221/034* (2013.01)

(58) Field of Classification Search
CPC .... G06F 21/575; G06F 9/4401; G06F 21/566; G06F 1/24; G06F 2221/034
See application file for complete search history.

(56) References Cited

U.S. PATENT DOCUMENTS

| 3,986,136 | A | * | 10/1976 | Hurlburt | ................. | A61B 5/16 |
| | | | | | | 331/78 |
| 6,188,257 | B1 | * | 2/2001 | Buer | ..................... | H03K 17/22 |
| | | | | | | 326/94 |
| 8,065,532 | B2 | | 11/2011 | Shu et al. | | |
| 9,165,143 | B1 | * | 10/2015 | Sanders | ................ | G06F 21/575 |
| 9,230,112 | B1 | * | 1/2016 | Peterson | ............... | G06F 21/575 |
| 9,602,501 | B1 | * | 3/2017 | Ramalingam | ......... | H04L 63/083 |
| 9,710,640 | B1 | * | 7/2017 | Ramalingam | ......... | G06F 21/445 |
| 9,893,898 | B2 | * | 2/2018 | Kreft | ....................... | G06F 21/71 |

(Continued)

OTHER PUBLICATIONS

Hagai Bar-El, "Introduction to Side Channel Attacks", Discretix Technologies, Ltd., White Paper, Jun. 1, 2010, pp. 1-12.

(Continued)

*Primary Examiner* — Don G Zhao
(74) *Attorney, Agent, or Firm* — Ronald O. Neerings; Charles A. Brill; Frank D. Cimino

(57) ABSTRACT

An embedded device is provided that is configured to randomize execution time of a boot process of the embedded device performed responsive to a reset signal, wherein reset release time is nondeterministic. The embedded device may include a randomizer component configured to generate a timeout signal after a random interval, wherein to randomize execution time, the embedded device is further configured to execute a first portion of a reset process, signal the randomizer component to generate the timeout signal after a first random interval, wait for the timeout signal, and execute a second portion of the reset process responsive to the timeout signal.

19 Claims, 9 Drawing Sheets

(56) References Cited

U.S. PATENT DOCUMENTS

| | | | | |
|---|---|---|---|---|
| 10,067,834 | B1* | 9/2018 | Montero | G06F 11/1417 |
| 2002/0156727 | A1* | 10/2002 | LeVake | G06Q 20/04 |
| | | | | 705/39 |
| 2005/0271202 | A1 | 12/2005 | Shu et al. | |
| 2006/0129848 | A1* | 6/2006 | Paksoy | G06F 21/78 |
| | | | | 713/193 |
| 2006/0177052 | A1* | 8/2006 | Hubert | H04L 9/003 |
| | | | | 380/29 |
| 2006/0236106 | A1* | 10/2006 | Patel | H04L 9/0844 |
| | | | | 713/169 |
| 2006/0236150 | A1* | 10/2006 | Lintz, Jr. | G06F 11/1417 |
| | | | | 714/6.13 |
| 2007/0094439 | A1* | 4/2007 | Kumar | G06F 9/4401 |
| | | | | 711/103 |
| 2007/0288738 | A1* | 12/2007 | Dale | G06F 21/575 |
| | | | | 713/2 |
| 2008/0086768 | A1* | 4/2008 | Mirza-Baig | H04L 63/0227 |
| | | | | 726/13 |
| 2008/0126766 | A1* | 5/2008 | Chheda | G06F 9/30003 |
| | | | | 712/226 |
| 2009/0193230 | A1* | 7/2009 | Findeisen | G06F 21/445 |
| | | | | 712/34 |
| 2015/0341384 | A1 | 11/2015 | Mandayam | |
| 2016/0350549 | A1* | 12/2016 | Hampel | G06F 21/57 |
| 2017/0180137 | A1* | 6/2017 | Spanier | H04L 9/3247 |
| 2017/0230179 | A1* | 8/2017 | Mannan | H04L 9/0897 |
| 2017/0255384 | A1* | 9/2017 | Hashimoto | G06F 3/061 |
| 2018/0075888 | A1* | 3/2018 | Le Roy | G06F 7/582 |
| 2018/0189496 | A1* | 7/2018 | Wu | G06F 21/575 |
| 2019/0047579 | A1* | 2/2019 | Fahim | B60W 50/023 |

OTHER PUBLICATIONS

Alessandro Barenghi et al, "Fault Injection Attacks on Cryptographic Devices: Theory, Practice and Countermeasures", Proceedings of the IEEE, vol. 100, Issue 11, Nov. 2012, Date of Publication: Apr. 5, 2012, pp. 3056-3076.

Jean-Sebastien Coron and Ilya Kizhvatov, "Analysis and Improvement of the Random Delay Countermeasure of CHES 2009", International Workshop on Cryptographic Hardware and Embedded Systems, Santa Barbara, CA, USA, Aug. 17-20, 2010, pp. 95-109.

Vincent Grosso et al, "Combining Leakage-Resilient PRFs and Shuffling Towards Bounded Security for Small Embedded Devices", International Conference on Smart Card Research and Advanced Applications, Nov. 5, 2014, pp. 122-136.

Pablo Rauzy and Sylvain Guilley, "Countermeasures Against High-Order Fault-Injection Attacks on CRT-RSA", 2014 Workshop on Fault Diagnosis and Tolerance in Cryptography (FDTC), Sep. 23, 2014, Busan, South Korea, pp. 1-23.

Amrit Mundra and Hong Guan, "Secure Boot on Embedded Sitara Processors", SPRY305, Texas Instruments, Inc., 2017 pp. 1-7.

* cited by examiner

FIG. 4
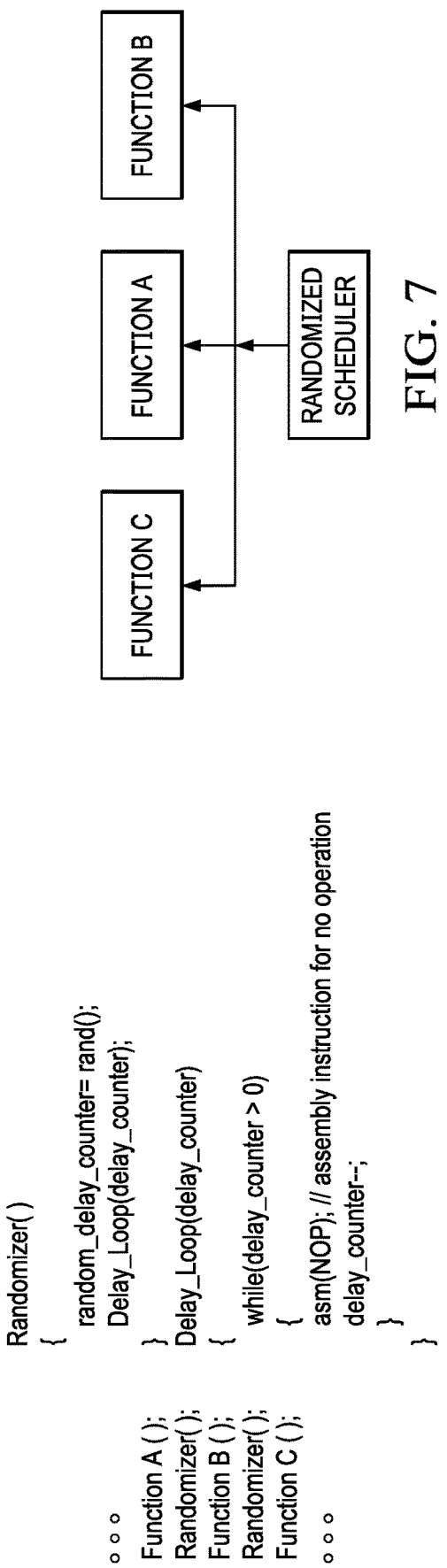
FIG. 7
```
Randomizer( )
{
  random_delay_counter= rand();
  Delay_Loop(delay_counter);
}
Delay_Loop(delay_counter)
{
  while(delay_counter > 0)
  {
    asm(NOP); // assembly instruction for no operation
    delay_counter--;
  }
}
```
○ ○ ○
Function A ();
Randomizer();
Function B ();
Randomizer();
Function C ();
○ ○ ○
FIG. 5

RANDOMIZED EXECUTION COUNTERMEASURES AGAINST FAULT INJECTION ATTACKS DURING BOOT OF AN EMBEDDED DEVICE

BACKGROUND OF THE DISCLOSURE

Field of the Disclosure

Embodiments of the present disclosure generally relate to countermeasures against fault injection attacks during boot of an embedded device.

Description of the Related Art

The integrity and trustworthiness of embedded devices in industrial and automotive applications is critical as disruptions in operation may have direct safety consequences. Fault injection attacks on safety critical systems implemented on embedded devices work by injecting faults at critical points in the system execution, causing the execution to go through unexpected and incorrect paths which results in the system inadvertently giving access to critical system functions to unauthorized parties. Faults can be injected using, for example, electromagnetic waves, frequency glitches, and voltage glitches. The first attack is typically trial and error and very time consuming and often requires detailed physical design knowledge and in-depth system knowledge. However, once a successful attack is launched, the same attack can be quickly and easily replicated across devices, as the runtime behavior for the same system across devices of the same type may be deterministic.

Some known software countermeasures for thwarting fault injection attacks rely on secure coding approaches such as redundant checks and comparisons against "magic" values to prevent faults form causing security failures. Some known hardware countermeasures for thwarting fault injection attacks include frequency and voltage monitors and wire meshes to prevent fault injection.

SUMMARY

Embodiments of the present disclosure relate to randomization of execution time of the boot process of an embedded device. In one aspect, an embedded device is provided that is configured to randomize execution time of a boot process of the embedded device performed responsive to a reset signal, wherein reset release time is nondeterministic.

In one aspect, a method for randomizing execution time of a boot process of an embedded device is provided that includes receiving a reset signal in the embedded device, executing a first portion of a reset process of the boot process responsive to the reset signal, signaling a randomizer component comprised in the embedded device to generate a timeout signal after a first random interval after executing the first portion, waiting for the timeout signal, and executing a second portion of the reset process responsive to the timeout signal.

In one aspect, an embedded device is provided that includes a randomizer component configured to generate a timeout signal after a random interval, a control component configured to signal the randomizer component to start operation at selected points in a reset process of the embedded device, wherein reset release time is nondeterministic, and a boot read-only-memory (ROM) configured to store boot code, wherein initiation of execution of the boot code after reset release is randomized, the boot code comprises a random delay between a first boot code function and a second boot code function such that execution time of a security function is nondeterministic, and an order of execution of at least some independent boot functions is randomized.

BRIEF DESCRIPTION OF THE DRAWINGS

Particular embodiments will now be described, by way of example only, and with reference to the accompanying drawings:

FIGS. 4 and 5 are simple examples illustrating the insertion of random delays in boot code;

FIG. 7 is a simple example illustrating randomized execution of independent boot code functions.

DETAILED DESCRIPTION OF EMBODIMENTS OF THE DISCLOSURE

Figure 1:
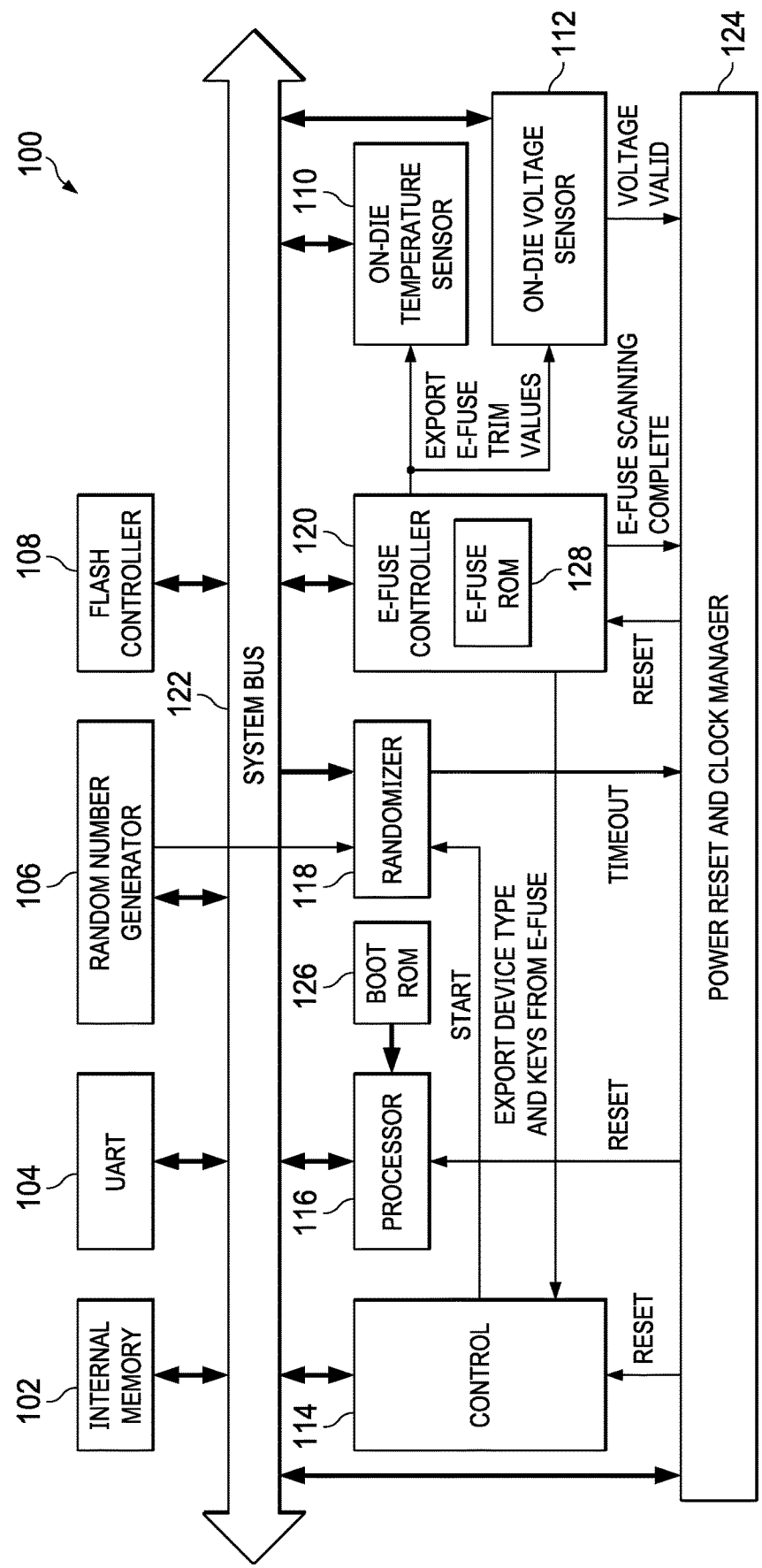
FIG. 1 is a simplified block diagram of an embedded device configured to provide randomized execution countermeasures to fault injection attacks.

Specific embodiments of the disclosure will now be described in detail with reference to the accompanying figures. Like elements in the various figures are denoted by like reference numerals for consistency.

The timing of the execution of the reset process of an embedded device and the execution of the boot code of the device may be deterministic, thus making the device vulnerable to fault injection attacks. Embodiments of the disclosure provide for random changes to execution time during device reset and boot processing at selected places that may otherwise be vulnerable to fault injection attacks. The use of randomization at selected places, e.g., before a security operation, cause the execution behavior of the embedded device during reset and boot code execution to be nondeterministic, which both increases the difficulty of succeeding with a fault injection attack and helps prevent repetition of a successful fault injection attack at those selected places. Embodiments provide for randomization of reset release time, randomization of execution time between externally observable events as boot code is executed, and/or randomization of independent execution sequences in the boot code.

FIG. 1 is a simplified block diagram of an embedded device 100, e.g., a microcontroller, configured to randomize execution time of the reset process and execution time of the boot code. The embedded device 100 includes internal memory 102, a universal asynchronous receiver/transmitter (UART) 104, a hardware random number generator 106, a flash memory controller 108, a control component 114, a processor 116, a randomizer component 118, an Efuse controller 120, an on-die temperature sensor 110, an on-die voltage sensor 112, and a power reset and clock manager (PRCM) 124 coupled to a system bus 122. The embedded device 100 further includes a boot read-only-memory (ROM) 126 coupled to the processor 116.

The internal memory 102 may be any suitable random access memory (RAM) and may store application instructions to be executed by the processor 116. The UART 104 provides a serial communication interface for communication with devices external to the embedded device 100. The UART 104 may have a configurable data format and configurable transmission speeds. The hardware random number generator 106 is configured to provide true random numbers during a reset/boot of the embedded device 100 and during operation of the embedded device 100. The flash memory controller 108 is configured to manage data stored on a flash memory, e.g., a secure digital (SD) card, coupled to the embedded device 100.

The control component 114 is configured to manage device level configuration. Device level configuration may include, for example, configuration of parameters common to multiple modules on the device 100, software configurable inputs to a single component, etc. Examples include configuring external pin multiplexing to indicate which pin of a component is routed to which external pin, selection of the clock source for a component, etc.

The processor 116 may be any processor suitable for the application of the embedded device 100, such as, for example, a processor from Intel Corp., a processor from Advanced Micro Devices, Inc., a Reduced Instruction Set Computer (RISC), an Application-Specific Integrated Circuit (ASIC), or the like.

The randomizer component 118 is configured to generate a timeout signal after a random interval. The randomizer component 118 may include circuitry to initialize a true hardware random number generator 106 and to seed timer circuitry with a random number obtained from the true hardware random number generator 106. The timer circuitry is configured to count down to zero, and then raise a timeout signal to the PRCM 124. The PRCM 124 is configured to de-assert the reset signal of internal components such as the Efuse controller 120, the processor 116, and external components such as flash memory responsive to the timeout signal from the randomizer component 118. The control component 114 is configured to signal the randomizer component 118 to start operation at selected points in the reset sequence responsive to signals generated during the reset sequence. Use of the randomizer component 118 during reset of the device 100 is described in reference to FIG. 2.

The Efuse controller 120 includes an Efuse ROM 128. The Efuse ROM 128 is a bank of fuses arranged in rows and columns that may be used to store security keys and trim values. The Efuse controller 120 is configured to scan the array to determine which Efuses are open and which are closed, convert that information into a binary 0 or 1, and provide the binary information to the relevant components of the device 100. The Efuse controller 120 is further configured to signal the PRCM 124 when scanning of the Efuse ROM 128 is complete.

The on-die temperature sensor 110 is an analog component configured to monitor the temperature of the device 100 to ensure the device 100 is operating within a valid temperature range. The on-die temperature sensor 110 is configured to send a signal to the PRCM 124 if the temperature is outside of the valid temperature range. The PRCM 124 is configured to activate security countermeasures such as erasing device secrets and powering down the device 100 if the on-die temperature sensor 110 signals an invalid temperature. The sensitivity of the on-die temperature sensor 110 may vary based on the manufacturing process, so the sensor 100 must be calibrated after manufacturing to ensure correct temperature reading. The calibration values are stored in the Efuse ROM 128 and used to initialize the on-die temperature sensor 110 during reset.

The on-die voltage sensor 112 is an analog component configured to monitor the voltage supplied to the device 100 to ensure the device 100 is operating within a valid voltage range. The on-die voltage sensor 112 is configured to send a signal to the PRCM 124 if the voltage is out of the valid voltage range. The PRCM 124 is configured to activate security countermeasures such as erasing device secrets and powering down the device 100 if the on-die voltage sensor 112 signals an invalid voltage. The sensitivity of the on-die voltage sensor 112 may vary based on the manufacturing process, so the sensor 112 must be calibrated after manufacturing to ensure correct voltage reading. The calibration values are stored in the Efuse ROM 128 and used to initialize the on-die voltage sensor 112 during reset.

The PRCM 124 is configured to control the clock, reset, and power management signals of the device 100. The PRCM 124 interfaces with all components of the device 100 for power, clock, and reset management through power control signals. The PRCM 124 includes functionality to handle power, reset, wake-up management, system clock source control, and clock generation, distribution, and management.

The boot ROM 126 stores the boot loader that is executed on power-on reset (POR) of the device 100 and a boot image. The boot loader is a program that loads the boot image into the internal memory 102 as per a configuration specified in the Efuse ROM 128. The boot image includes functionality to perform essential initialization such as programming the clocks and stacks, setting up interrupts and watchdog timers, etc. The boot image also includes functionality to configure input/output elements and pin multiplexing based on configuration information specified in the Efuse ROM 128, to initialize the flash controller 108, and to load application code from flash memory via the flash controller 108, via the UART 104, or from other external storage (not shown). The boot order may be specified by configuration information in the Efuse ROM 128.

In some embodiments, the time that the boot loader is started is randomized so that the time when the device 100 begins executing instructions is not fixed. That is, the first instructions in the boot loader are a delay loop that executes for a randomly selected number of times before the actual boot load instructions are executed. The delay loop may request a random number from the random number generator 106 and use that random number to determine how many times a "dummy" instruction, e.g., a NOP, is to be executed before allowing the boot load instructions to execute. As the random number generated by the random number generator 106 can be large, a fixed number of bits of the random number may be used to determine the delay loop count to keep the delay within reasonable bounds.

In some embodiments, the device 100 is configured to provide a secure boot process in which the boot code in the boot ROM 126 is certified to be secure and authentic. In such embodiments, the boot loader and other code loaded during the boot process may be encrypted and encryption keys stored in the Efuse ROM 128. The execution of the secure boot process may be randomized such that the time when selected security related functions susceptible to fault injection attacks are executed is not the same for each reset/boot of the device 100. Examples of such security related functions include comparison of key values in the boot image to keys stored in the Efuse ROM 128, message signature verification, hashing operations, and reading boot images from external devices via the UART 104 and/or the flash controller 108.

In some embodiments, random time delays are executed between selected boot functions to change the time when subsequent security related functions begin execution. Such embodiments are described below in reference to FIG. 4 and FIG. 5. In some embodiments, the order of execution of independent boot functions is randomized to change the time when subsequent security related functions begin execution. Such embodiments are described below in reference to FIG. 7.

Figure 2:
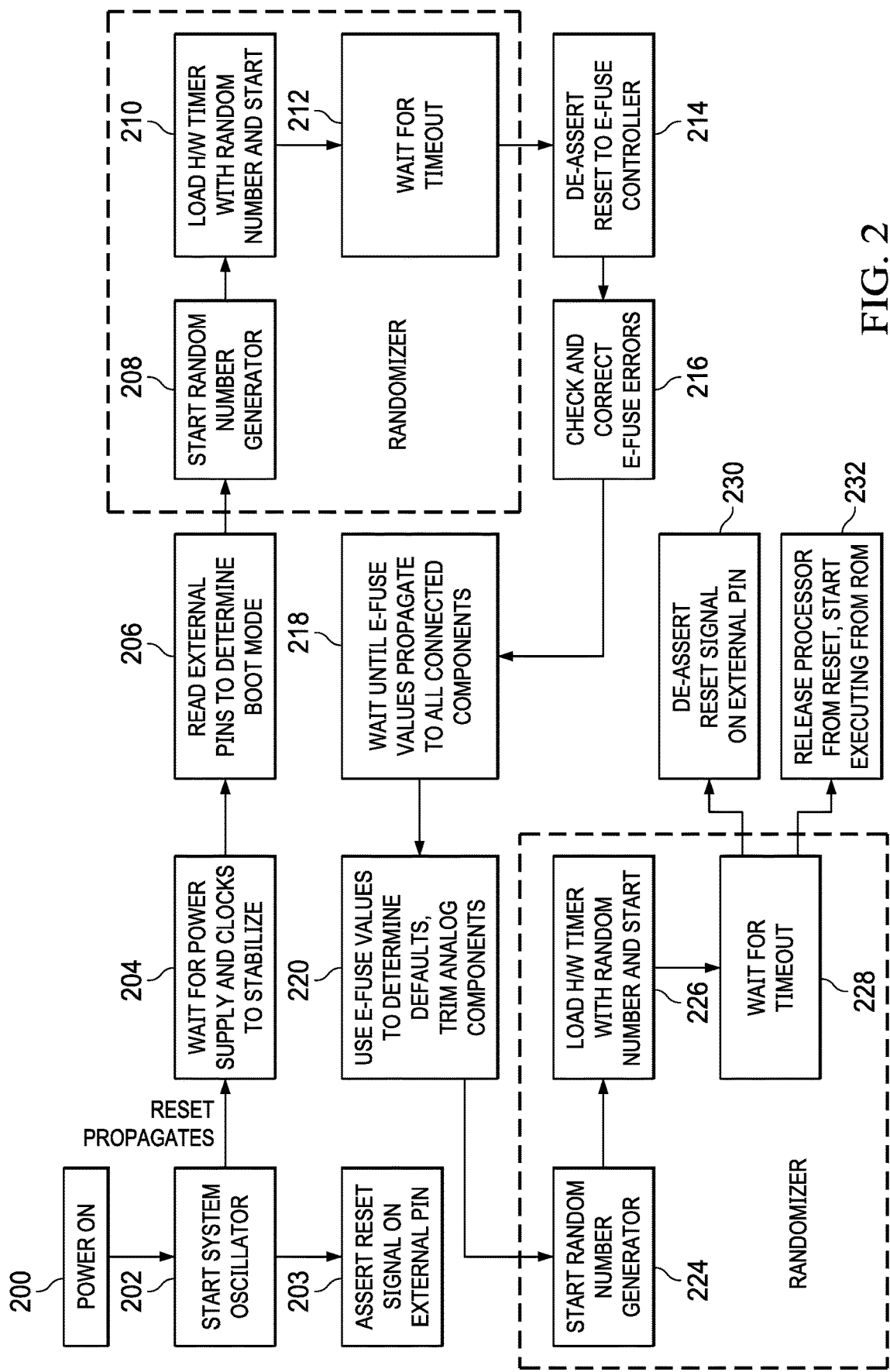
FIG. 2 is a flow diagram of example reset processing with randomization that may be performed by the embedded device of FIG. 1.

FIG. 2 is flow diagram of example reset processing with randomization that may be performed by the device 100 of FIG. 1. In this example, the randomization is performed in two places. One of ordinary skill in the art will understand embodiments in which more or less randomization is used and/or randomization is performed at other points in the reset processing. As shown in FIG. 2, when the power to the device 100 is turned on 200, the system oscillator is started 202 and a reset signal is asserted 203. The reset signal is propagated to the PRCM 124, which propagates the reset signal to other components on the device 100. The process waits 204 until the power supply and clocks are stabilized.

The external pins are read 206 by the control component 114 to determine the boot mode. The control component 114 then signals the randomizer component 118 to start a random delay countdown. The randomizer component 118 starts 208 the hardware random number generator 106, loads 210 a hardware timer with a random number based on a random number from the random number generator 106, starts the hardware timer, and waits 212 for the timeout signal from the hardware timer. The randomizer component 118 sends the timeout signal to the PRCM 124 to indicate that the reset process should continue.

The reset to the Efuse controller 120 is then de-asserted by the PRCM 124 to start scanning of the Efuse ROM 128. The Efuse controller 120 then checks 216 for errors in the values read from Efuse ROM 128 and corrects the errors. The Efuse controller 120 then propagates 218 the values read from the Efuse ROM 128 to all the components of the device 100 that are connected to the Efuse controller 120. Once the Efuse values have reached all connected components, the Efuse controller 120 signals the PRCM 124 that the Efuse Scan is complete.

The propagated Efuse values are then applied 220. For example, the control component 114 may use propagated Efuse values for device level configuration. In addition, the on-die temperature sensor 110 and the on-die voltage sensor 112 may be trimmed using trim values propagated from the Efuse ROM 128. The randomizer component 118 is then signaled to perform a random delay by the control component 114. The randomizer component 118 starts 224 the hardware random number generator 106, loads 226 a hardware timer with a random number determined based on a random number from the random number generator 106, starts the hardware timer, and waits 228 for the timeout signal from the hardware timer. The randomizer component 118 then sends the timeout signal to the PRCM 124.

The PRCM 124 then starts a de-assertion sequence to de-assert 230 the reset signal and releases the processor 116 from reset. Releasing the processor from reset causes the boot loader in the boot ROM 126 to begin execution. As previously mentioned, the first instructions of the boot loader may be a delay loop that executes for a randomly selected number of times before the actual boot load instructions are executed.

Figure 3A:
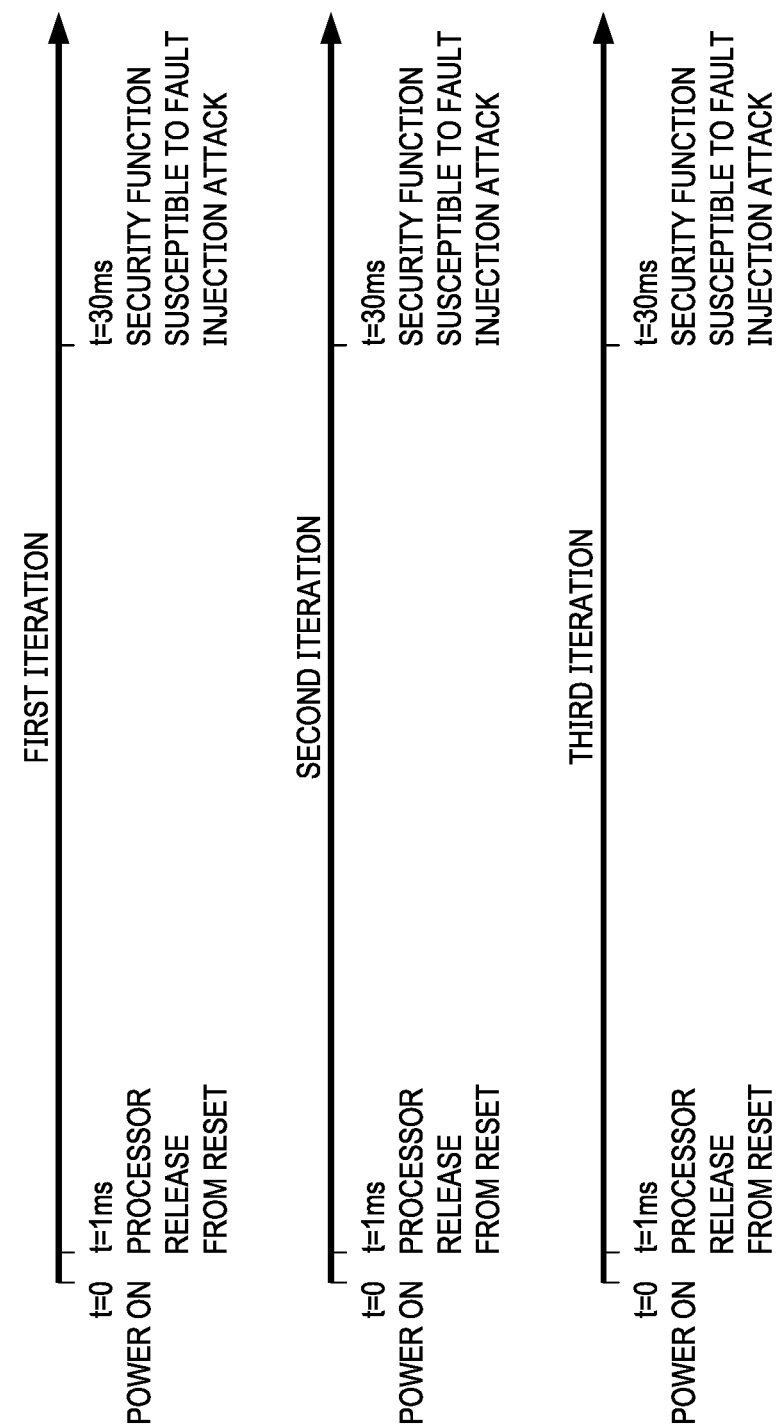
FIGS. 3A and 3B are an example illustrating the effect of inserting randomization into the device reset process.
Figure 3B:
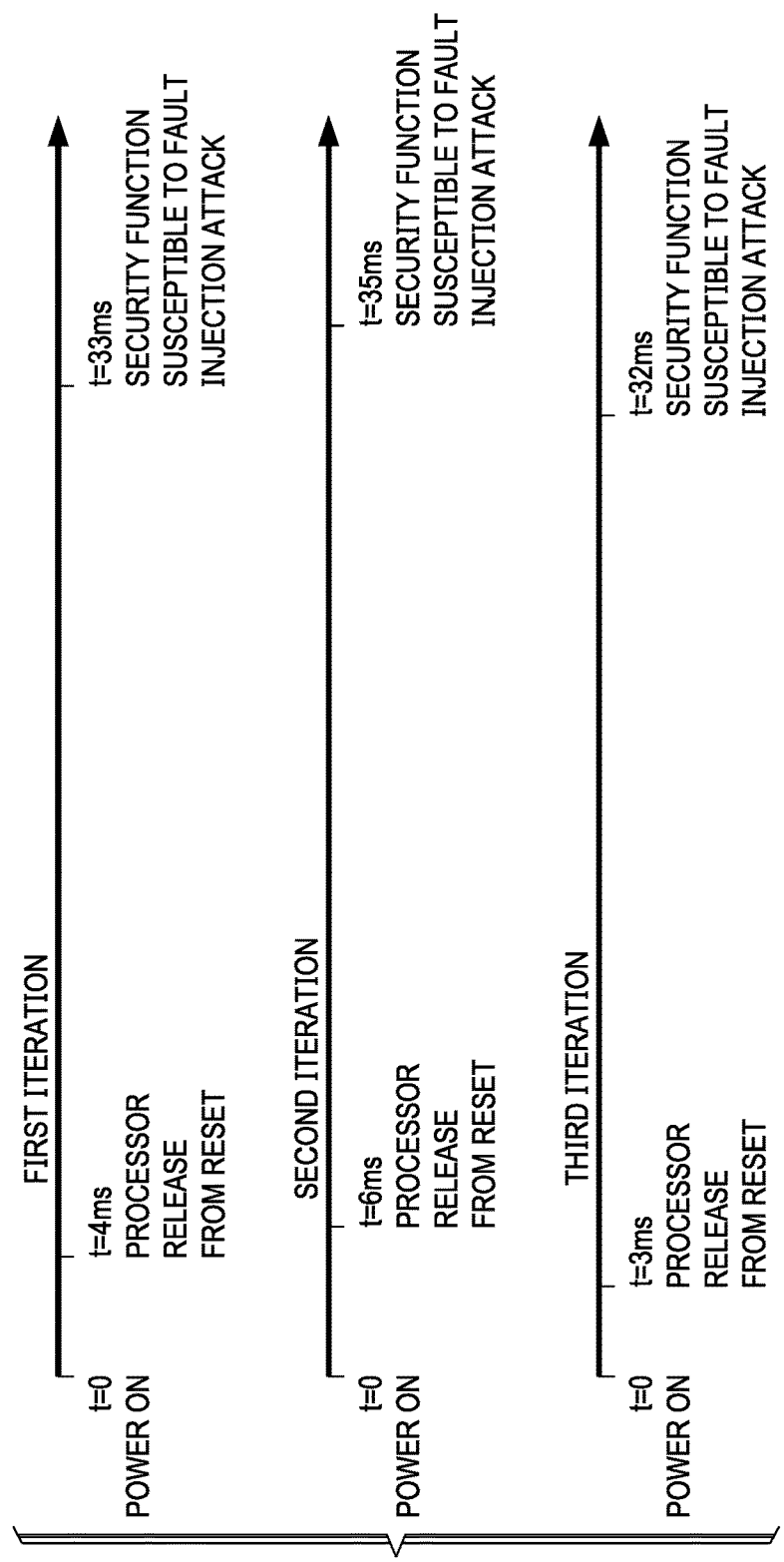

FIGS. 3A and 3B are an example illustrating the effect of inserting randomization into the device reset process. As illustrated in FIG. 3A, without randomization, the processor release from reset and the timing of execution of a security function after the release from reset are the same for each POR. Thus, if an attacker determines that a security function will always occur 30 ms after POR, any compromise to that function can be repeated across all products using the embedded device. As illustrated in FIG. 3B, with randomization, the processor release from reset and the timing of execution of a security function after the release from reset may vary slightly for each POR. Thus, an attacker will have more difficulty determining when the security function occurs and, even if the attacker is successful with one attack, the attack will not be repeatable as the security function will occur at a different time on the next POR.

As previously mentioned, in some embodiments, random time delays are added between selected functions in the boot code in order to randomize the time when a subsequent security related function begins execution. The particular functions selected may be those that generate externally observable events or signal changes such as initializing the UART, a universal serial bus (USB) interface, or an Ethernet component to start communicating external to the device, initializing an external memory interface such as the flash controller 106, and initializing clock lines.

FIG. 4 is a simple example illustrating the insertion of the random delays. In this example, Function A, Function B, and Function C are boot code functions and the randomizer is a software function that implements a randomized delay loop. For example, Function A may be clock initialization, Function B may be memory initialization, and Function C may be peripheral initialization, e.g., the UART 104 and the flash controller 108. FIG. 5 is an example illustrating the boot code execution sequence and example pseudo code for a randomizer software function implementing a randomized delay loop.

Figure 6A:
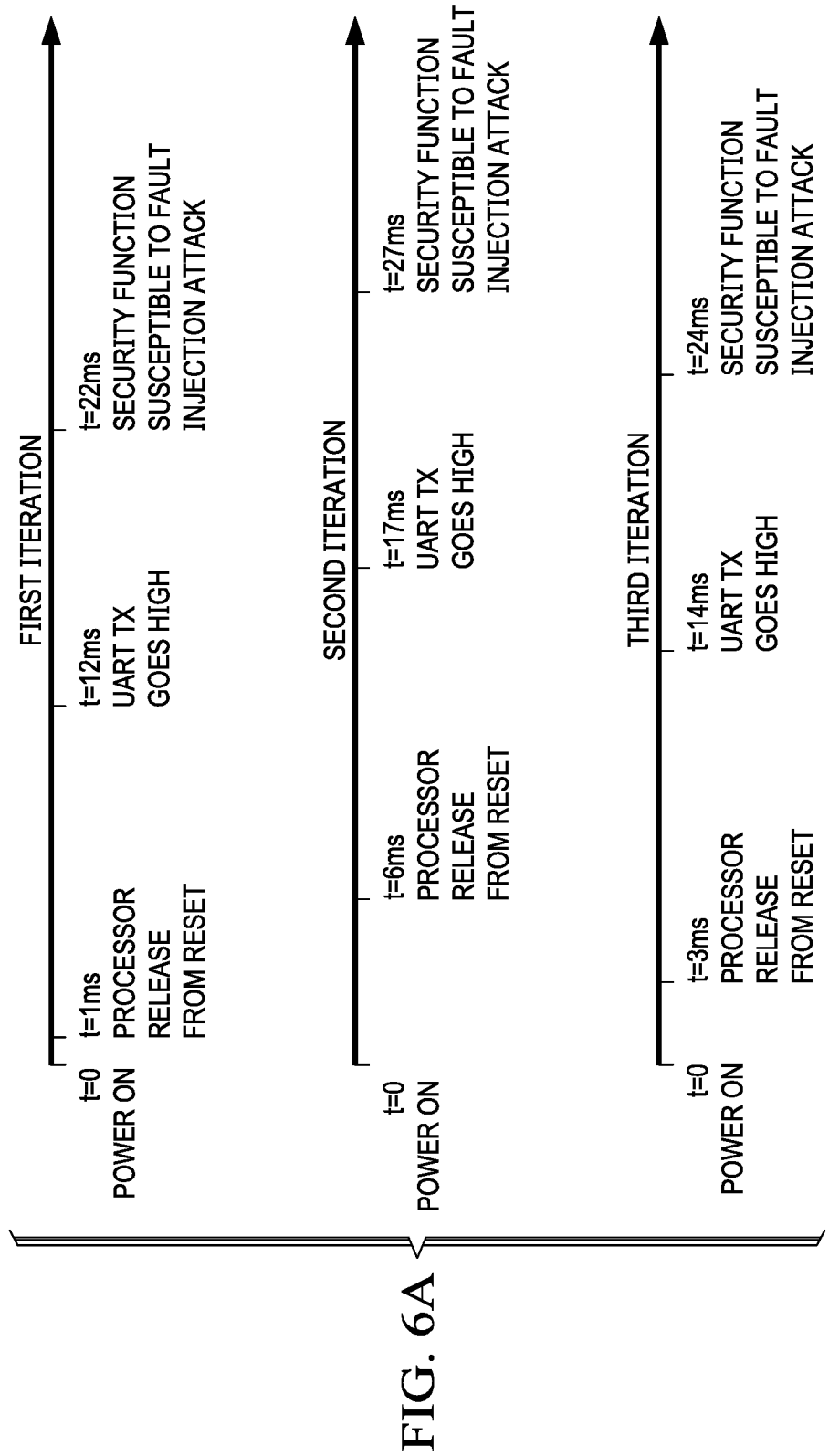
FIGS. 6A and 6B are an example illustrating the effect of adding random delays between boot code functions in addition to the randomization of the reset process.
Figure 6B:
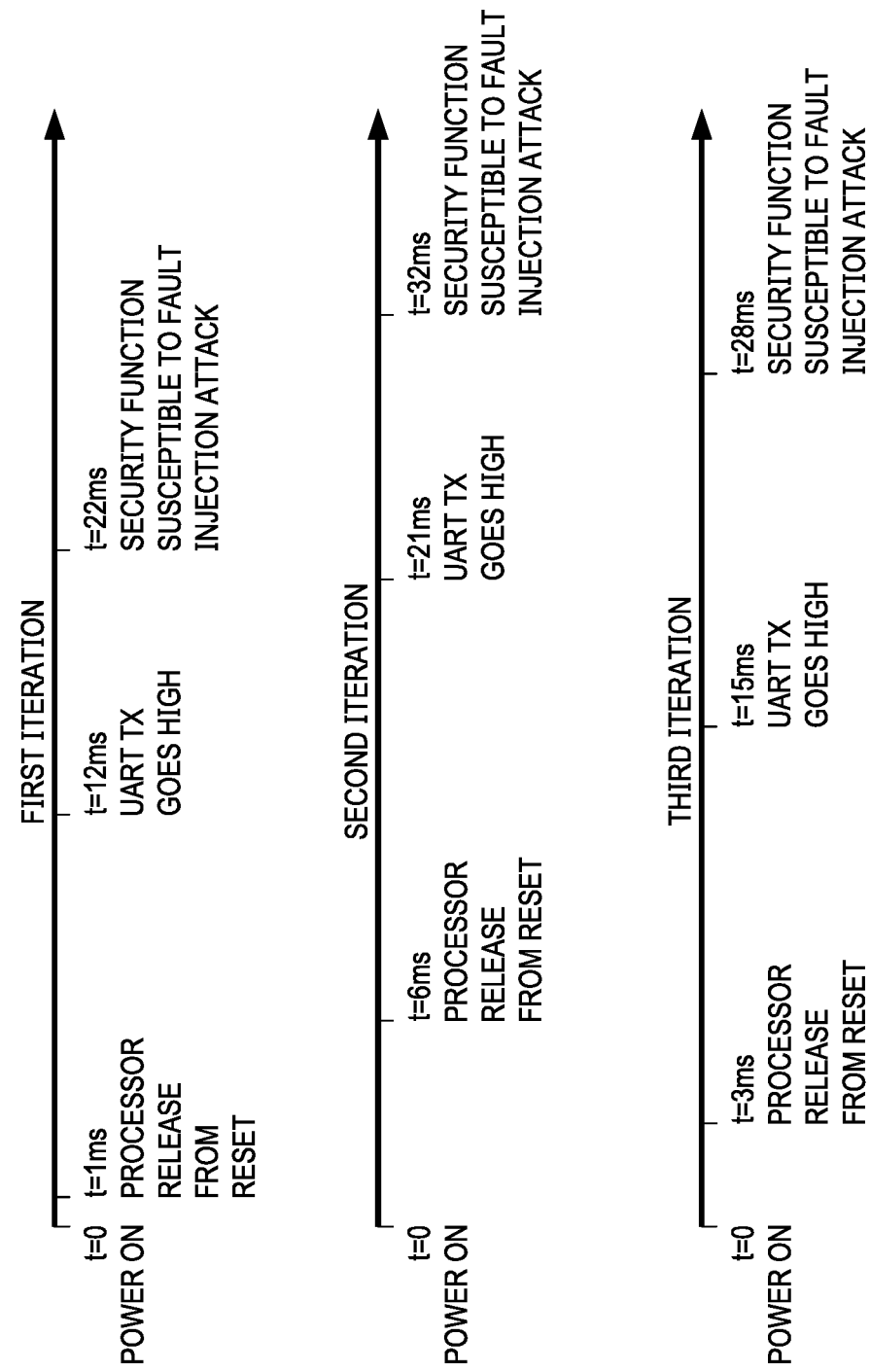

FIGS. 6A and 6B are an example illustrating the effect of adding random delays between boot code functions in addition to the randomization of the reset process. The reset signal is not the only signal that can be used as a baseline for a fault injection attack. Even if the reset process is randomized, an attacker can use another external signal as a baseline. As illustrated in FIG. 6A, even with randomization of the reset process, a fault can always be injected 10 ms after the UART transmit signal goes high, which can comprise the subsequent security function. As illustrated in FIG. 6B, the added random delays cause a random variation in the time between when the UART transmit signal goes high and the security function each time the device is booted. Thus, an attacker will have more difficulty determining when the security function occurs and, even if the attacker is successful with one attack, the attack will not be repeatable as the security function will occur at a different time on the next reset.

As previously mentioned, in some embodiments, the order of execution of independent boot functions in the boot code is randomized to change the time when a subsequent security related function begins execution. Such randomization causes the time between externally observable events to be non-deterministic. FIG. 7 is a simple example illustrating randomized execution order. In this example, Function A, Function B, and Function C are independent boot code functions and the randomized scheduler is a software function that implements the random execution of order of these boot code functions. The randomized scheduler includes a table of the independent functions in the boot code that can be executed in any order and is configured to invoke these functions in a random order using indices derived from random numbers from the hardware random number generator 106. Table 1 shows example pseudo code for the randomized scheduler. Examples of independent boot code functions that can be executed in random order include setup of a phase locked loop (PLL), setup a memory management unit, and pin multiplexing configuration.

TABLE 1

```
// Assume 8 functions are randomizable
Num_randomizable functions = 8
Array_of_randomizable_functions=[PLL_Setup,
MMU_Setup, Pinmux_Setup, ...]
Function_Completed_flags[0,0,0,0..]
Count = 0
while (count < 100) do
Read random number from random number generator
Array_index = 3 most significant bits of the random number
//Call function using pointer if not called before
If (Function_Completed_flag_array[Array_index ] == 0]
            Array_of_randomizable_functions
            [Array_index ]( ) // Call function
            Function_Completed_flags [Array_index ] =
            1 // Mark function as called
//Call any uncalled functions sequentially
Count = 0
While count < Num_randomizable do
If (Function_Completed_flag [Array_index ] == 0]
            Array_of_randomizable_functions
            [Array_index ]( ) // Call function
            Function_Completed_flag [Array_index ] =
            1 // mark function as called
```

Figure 8A:
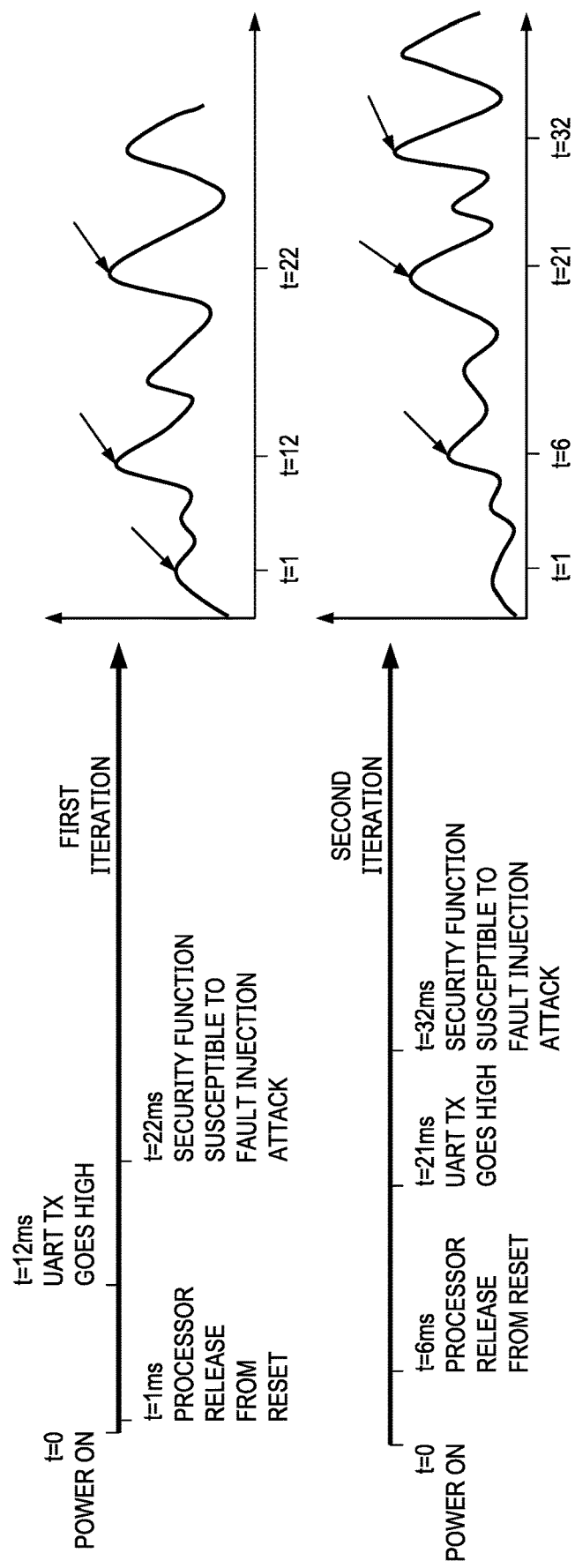
FIGS. 8A and 8B are an example illustrating the effect of adding randomized execution of boot code functions in addition to randomization of the reset process and adding random delays to the boot code.
Figure 8B:
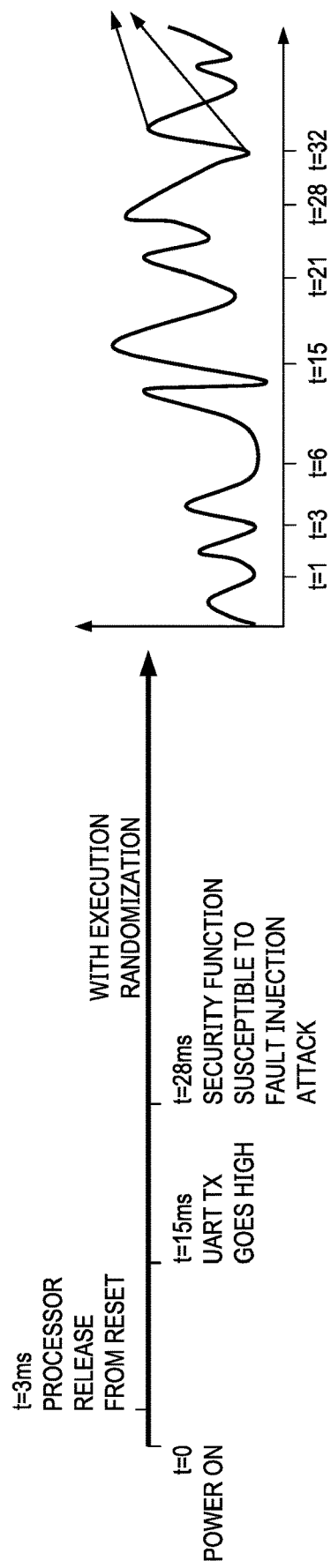

FIGS. 8A and 8B are an example illustrating the effect of adding randomized execution of boot code functions in addition to the randomization of the reset process and adding random delays to the boot code. As illustrated in FIG. 8A, even with the other forms of randomization in place, the observable power consumption over time indicates that the device is still leaking information. In other words, while the other forms of randomization have modified the time between peaks, the peaks always come in a fixed sequence, betraying the changing states of the device. As illustrated in FIG. 8B, with the addition of randomized boot function execution, the sequence of the peaks is no longer predictable which makes it more difficult for an attacker to glean information of the system stat from the power consumption patterns.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which a delay loop is implemented using a NOP instruction. One of ordinary skill in the art will understand embodiments in which another instruction or multiple instructions may be executed in the delay loop.

In another example, one of ordinary skill in the art will understand embodiments in which random delays and/or randomization of function calls are used in other executable code once the device is booted.

In another example, embodiments have been described herein in which the randomized component used a timer to implement the random delay. One of ordinary skill in the art will understand embodiments in which alternate approaches to implement the random delay are used.

In another example, embodiments have been described herein in which the reset of the embedded device is a power on reset. One of ordinary skill in the art will understand embodiments for other resets of an embedded device, such as, for example a warm reset, a cold reset, etc. One of ordinary skill in the art will also understand embodiments for booting an embedded device from a low power state.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular device components. As one skilled in the art will appreciate, components in devices may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. An embedded device, comprising:
a randomizer component configured to generate a timeout signal after a random interval, and
a control component configured to execute a portion of a reset process, pause the reset process and signal the randomizer component to generate the timeout signal after a first random interval, wait for the timeout signal to be generated, and continue the reset process after the timeout signal is detected.

2. The embedded device of claim 1, wherein a reset process of the boot process is a power on reset process.

3. The embedded device of claim 1, further comprising a hardware random number generator, and wherein the randomizer component comprises timer circuitry and circuitry to initialize the hardware random number generator and to obtain a random number from the hardware random number generator to seed the timer circuitry.

4. The embedded device of claim 1, wherein the embedded device is further configured to signal the randomizer component to generate the timeout signal after a second random interval after a second portion is executed.

5. The embedded device of claim 1, further comprising:
a boot read-only-memory (ROM) configured to store boot code, wherein initiation of execution of the boot code after reset release is randomized.

6. The embedded device of claim 5, wherein the boot code comprises a random delay between a first boot code function and a second boot code function, wherein execution time of a security function is nondeterministic.

7. The embedded device of claim 6, wherein the random delay is implemented as a delay loop that is executed for a randomly selected number of times.

8. The embedded device of claim 6, wherein the boot code is configured to randomize an order of execution of independent boot functions.

9. The embedded device of claim 1, further comprising a control component coupled to the randomizer component and configured to signal the randomizer component to start operation at selected points in the reset process.

10. A method for randomizing execution time of a boot process of an embedded device, the method comprising:
  receiving a reset signal in the embedded device;
  executing a portion of a reset process of the boot process responsive to the reset signal;
  generating a random timeout signal after a random interval after executing the portion;
  waiting for the timeout signal; and
  resuming executing a remaining portion of the reset process responsive to the timeout signal.

11. The method of claim 10, further comprising:
  generating the random timeout signal after a second random interval after continuing executing the portion.

12. The method of claim 10, wherein the reset process is a power on reset process.

13. The method of claim 10, further comprising initializing a hardware random number generator comprised in the embedded device and seeding timer circuitry based on a random number obtained from the hardware random number generator.

14. The method of claim 10, further comprising randomizing initiation of execution of boot code after reset release.

15. The method of claim 14, further comprising executing a random delay between a first boot code function and a second boot code function, wherein execution time of a security function is nondeterministic.

16. The method of claim 15, wherein the random delay is implemented as a delay loop that is executed for a randomly selected number of times.

17. The method of claim 15, further comprising randomizing an order of execution of independent boot functions.

18. An embedded device, comprising:
  a randomizer component configured to generate a timeout signal after a random interval;
  a control component configured to signal the randomizer component to start operation at selected points in a reset process of the embedded device, wherein time of reset release time is nondeterministic; and
  a boot read-only-memory (ROM) configured to store a plurality of boot codes for the reset process, wherein initiation of the reset process includes executing a first boot code after the reset release, which is randomized, the reset process comprises a random delay between executing the first boot code and executing a second boot code such that execution time of the reset process is nondeterministic.

19. The embedded device of claim 18, further comprising a hardware random number generator, and wherein the randomizer component comprises timer circuitry and circuitry to initialize the hardware random number generator and to obtain a random number from the hardware random number generator to seed the timer circuitry.

* * * * *